United States Patent
Pan et al.

(10) Patent No.: US 8,351,725 B2
(45) Date of Patent: Jan. 8, 2013

(54) IMAGE SHARPENING TECHNIQUE

(75) Inventors: Hao Pan, Camas, WA (US); Yeping Su, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1120 days.

(21) Appl. No.: 12/284,631

(22) Filed: Sep. 23, 2008

(65) Prior Publication Data

US 2010/0074548 A1   Mar. 25, 2010

(51) Int. Cl.
- *G06K 9/40* (2006.01)
- *G06K 9/48* (2006.01)
- *G06K 9/32* (2006.01)
- *G09G 5/00* (2006.01)
- *G09G 5/02* (2006.01)
- *H04N 5/44* (2011.01)
- *H04N 9/74* (2006.01)
- *H04N 3/223* (2006.01)

(52) U.S. Cl. ........ 382/260; 382/263; 382/266; 382/199; 382/200; 382/298; 345/660; 345/698; 348/561; 348/581; 348/704

(58) Field of Classification Search .................. None
See application file for complete search history.

(56) References Cited

U.S. PATENT DOCUMENTS

| | | | |
|---|---|---|---|
| 5,012,333 A | 4/1991 | Lee et al. | |
| 5,422,827 A | 6/1995 | Niehaus | |
| 6,075,926 A | 6/2000 | Atkins et al. | |
| 6,289,133 B1 | 9/2001 | Oshino | |
| 6,600,517 B1 | 7/2003 | He et al. | |
| 6,657,677 B1 | 12/2003 | He et al. | |
| 7,155,069 B2 * | 12/2006 | Ishizaka | 382/298 |
| 7,259,796 B2 | 8/2007 | Sha et al. | |
| 8,233,748 B2 * | 7/2012 | Lee et al. | 382/300 |
| 2001/0038716 A1 | 11/2001 | Tsuchiya et al. | |
| 2003/0007686 A1 | 1/2003 | Roever | |
| 2004/0013310 A1 | 1/2004 | Suino et al. | |
| 2004/0190023 A1 | 9/2004 | Aoyama | |
| 2004/0260662 A1 | 12/2004 | Staelin et al. | |
| 2006/0056723 A1 * | 3/2006 | Pan | 382/268 |
| 2006/0115176 A1 * | 6/2006 | Kanamori et al. | 382/266 |
| 2007/0153022 A1 | 7/2007 | Keshet | |
| 2008/0025622 A1 | 1/2008 | Hanamoto et al. | |
| 2008/0055338 A1 | 3/2008 | Wei et al. | |
| 2008/0174699 A1 | 7/2008 | Suzuki et al. | |

(Continued)

FOREIGN PATENT DOCUMENTS

JP    08-27996    10/1996

(Continued)

OTHER PUBLICATIONS

Int'l Search Report issued Oct. 27, 2009 in connection with corresponding PCT Application, Serial No. PCT/JP2009/066315, 3 pages.

(Continued)

*Primary Examiner* — Randolph I Chu

(74) *Attorney, Agent, or Firm* — Chernoff Vilhauer McClung & Stenzel

(57) ABSTRACT

A sharpening technique for digital images for presentation on a display. The technique may include an upscaling process, a noise reduction process, and a sharpening process. The technique may further use a single buffer for the upscaling, noise reduction, and sharpening.

13 Claims, 22 Drawing Sheets

U.S. PATENT DOCUMENTS

2008/0291332 A1 * 11/2008 Messing et al. ............... 348/625

FOREIGN PATENT DOCUMENTS

| | | |
|---|---|---|
| JP | 2004-266757 | 9/2004 |
| JP | 2006-317406 | 11/2006 |
| JP | 2007-317109 | 12/2007 |
| JP | 2008-42407 | 2/2008 |
| JP | 2008-123349 | 5/2008 |
| JP | 2008-141658 | 6/2008 |
| WO | WO 01/67392 | 9/2001 |

OTHER PUBLICATIONS

Yuki Ishii; Fresh Eyes—Introduction of Video Research Laboratory; The Journal of Institute of Image Information and Television Engineers; Jan. 1, 2008; vol. 62 No. 1; pp. 52-54.

* cited by examiner

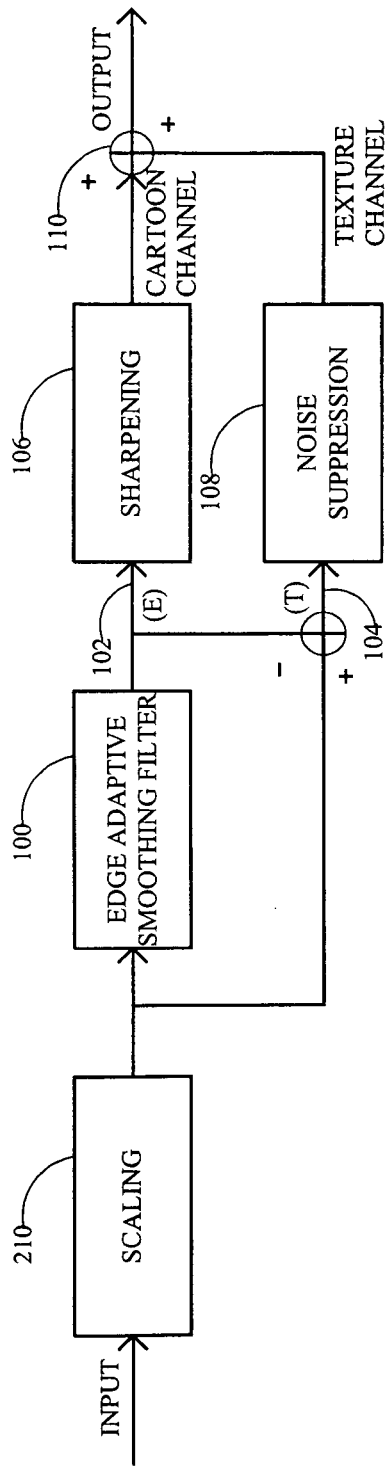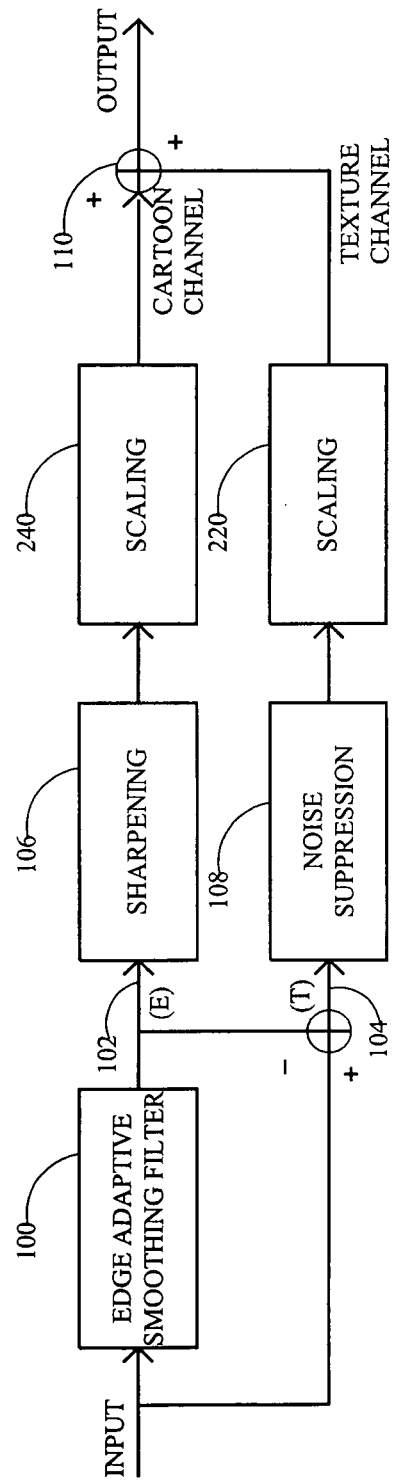

IMAGE SHARPENING TECHNIQUE

CROSS-REFERENCE TO RELATED APPLICATIONS

Not applicable.

BACKGROUND OF THE INVENTION

The present invention relates to sharpening of digital images and video for presentation on a display.

The resolution of a typical liquid crystal display is approximately 1920×1080 which is on the order of standard definition television. The resolution of a typical very high resolution diagonal display may be 4096×2160 or 3840×2160, and typically has viewing distances that are less than 2 picture heights. In order to display an image on a display in an aesthetically pleasing manner sharpening of the image is typically performed. The lack of sharpness typically results from imperfections in the captures process and/or loss of details due to image compression. However, sharpening of the image tends to result in annoying artifacts.

The traditional approaches to sharpening, such as using an unsharp mask, generally result in the introduction of visible degradation into the image being sharpened. The visual degradation is primarily due to enhancing the high frequency components and noise that often dominates the high frequency bands of an image. To moderate the enhancement of the visible degradation of the image, the amount of sharpening performed is controlled.

It is desirable to increase the sharpness of the image content while at the same time suppressing the noise in the resulting image.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 illustrates another image sharpening with resolution change.

FIG. 4 illustrates another image sharpening with resolution change.

DETAILED DESCRIPTION OF PREFERRED EMBODIMENT

Image sharpening techniques are designed to enhance the high frequency aspects of the image. High frequency aspects, such as edges around major features of the image, are particularly desirable to sharpen in order to improve the visual appearance of the image to the viewer. However sharpening high frequency aspects, such as noise in the texture regions of the image, are not desirable because it degrades the visual appearance of the image to the viewer. These tradeoff are generally contradictory to one another, while on the one hand a desire to enhance the high frequency aspects of portions of the image while on the other hand a desire not to enhance the high frequency aspects of other portions of the image.

Attempting to develop a universal sharpening filter has proved to be elusive. It has been determined that sharpening an image is best done using multiple different filters or otherwise a filter applied to only a portion of the image. Each of the different filters should filter the image in a different manner so that the beneficial aspects of each of the filters may be taken advantage of. It is to be understood that any filter maybe used, such as those that sharpen the image.

Figure 1:
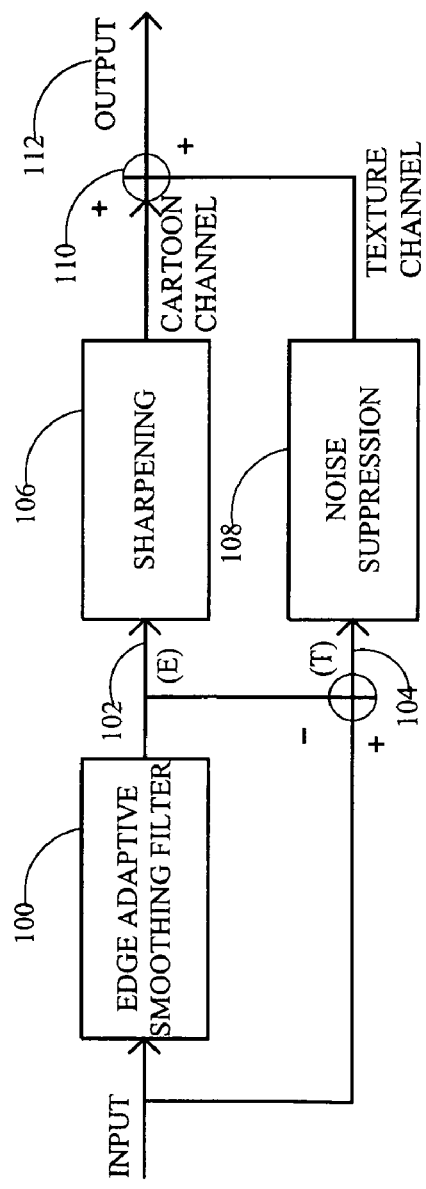
FIG. 1 illustrates image sharpening without resolution change.

Referring to FIG. 1, it was determined that the system may preprocess the incoming image with a non-linear edge-adaptive smoothing filter 100 that is used to separate the image into multiple "channels". It is noted that these "channels" need not be frequency bands, or directly related to the frequency domain. The filter may be referred to as an edge-adaptive smoothing filter or any other suitable filter. One channel 102 may contain the edge content and slowly varying "flat" regions of the image where edges (which generally contain high spatial frequencies) are retained and remain generally sharp, but textures (which also contain high spatial frequencies) are generally filtered out. The other channel 104 may contain the textures of the image minus edges. A linear filter is not especially suitable for such selective filtering.

These two channels, namely, texture information (T) 104 and edge+flat regions 102 (E), can be used in a number of ways to produce a high quality sharpened image. One approach is to use a sharpening technique 106 on the edge+flat regions 102 to enhance the image. The edge+flat regions 102 is generally noise free so the enhancement of that channel does not substantially increase the resulting noise in the final image. A noise suppression technique 108 on the texture channel 104 reduces the noise that is contained in that channel. Thereafter, the two channels T 104 and E 102 are recombined 110 into the final output 112. Accordingly, those edge aspects of the image that are desirable to sharpen are suitably enhanced without substantial enhancement of the noise, while the other aspects of the image that are not desirable to sharpen are suitably attenuated in a manner to reduce the noise.

Figure 2:
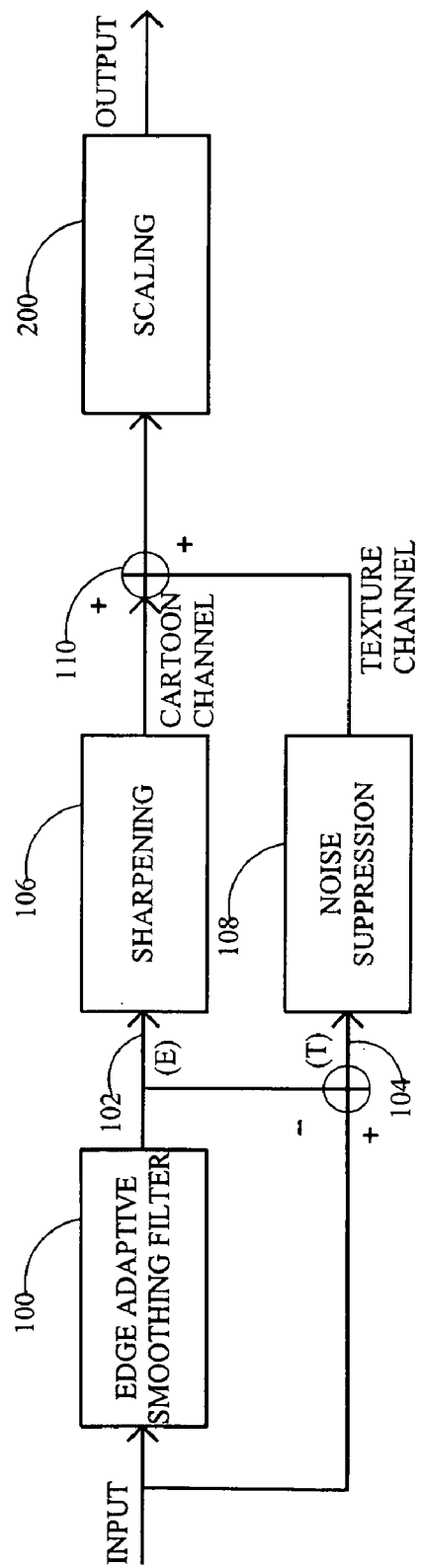
FIG. 2 illustrates image sharpening with resolution change.

When the input resolution and the desired output resolutions are different, one or more scaling operations may be included to re-scale the image. Referring to FIG. 2, one technique for scaling the image is to include an image scaling operation 200 at the output thereof. In this manner, the image processing pipeline may process the image at a first input resolution then use a high quality scaling operation 200 to achieve the desired output results. This manner of processing maintains the image processing pipeline with relatively low complexity Referring to FIG. 3, another technique for scaling the image is to include an image scaling operation 210 at the input thereof. In this manner, the image processing pipeline may be designed to process images at a single image resolution that is the same as the scale provided at the output of the input image scaling operation, which decreases the complexity of the image processing pipeline. The image processing pipeline may be optimized for a single image scale.

Referring to FIG. 4, another technique for scaling the image is to include an image scaling operation 220 after the noise suppression in the texture channel (T). The texture channel has particular image characteristics and the scaling filter may be designed to accommodate the particular image characteristics. The combination of the scaling operation and noise suppression may be such that improved image characteristics are achieved. An image scaling operation 240 after the sharpening in the flat images+edges channel (E). The channel E has particular image characteristics and the scaling filter may be designed to accommodate the particular image characteristics. The combination of the scaling operation and sharpening may be such that improved image characteristics are achieved.

Figure 5:
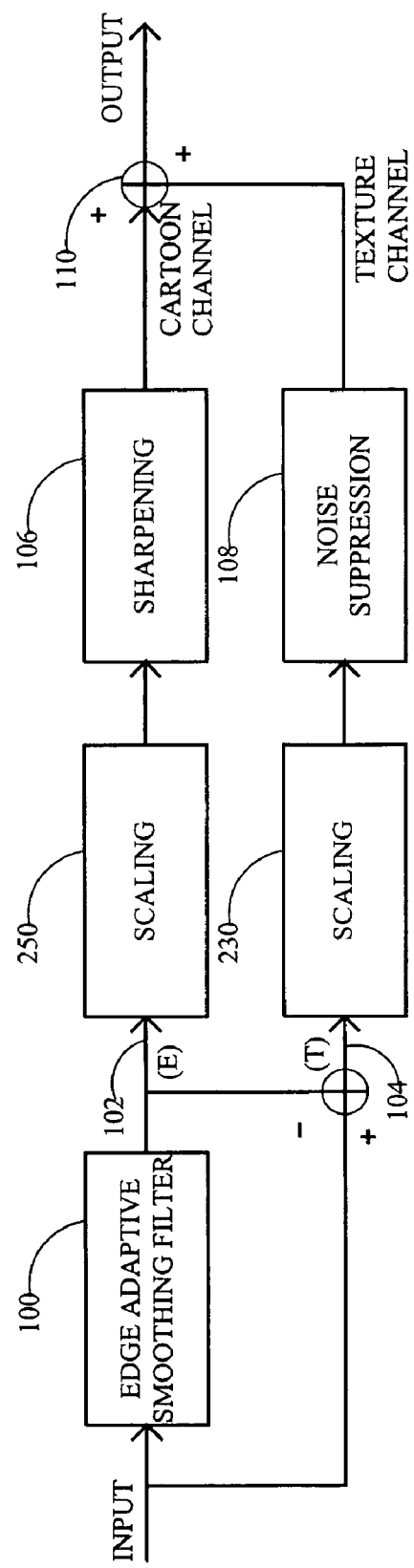
FIG. 5 illustrates another image sharpening with resolution change.

Referring to FIG. 5, another technique for scaling the image is to include an image scaling operation 230 before the noise suppression in the texture channel (T). The scaling may be designed to accommodate the added noise in the channel, that is thereafter suppressed by the noise suppression. The combination of the scaling operation and noise suppression may be such that improved image characteristics are achieved. An image scaling operation 250 before the sharpening in the flat images+edge channel (E). The scaling may be designed to accommodate the reduced noise in the channel. The combination of the scaling operation and sharpening may be such that improved image characteristics are achieved.

Figure 6:
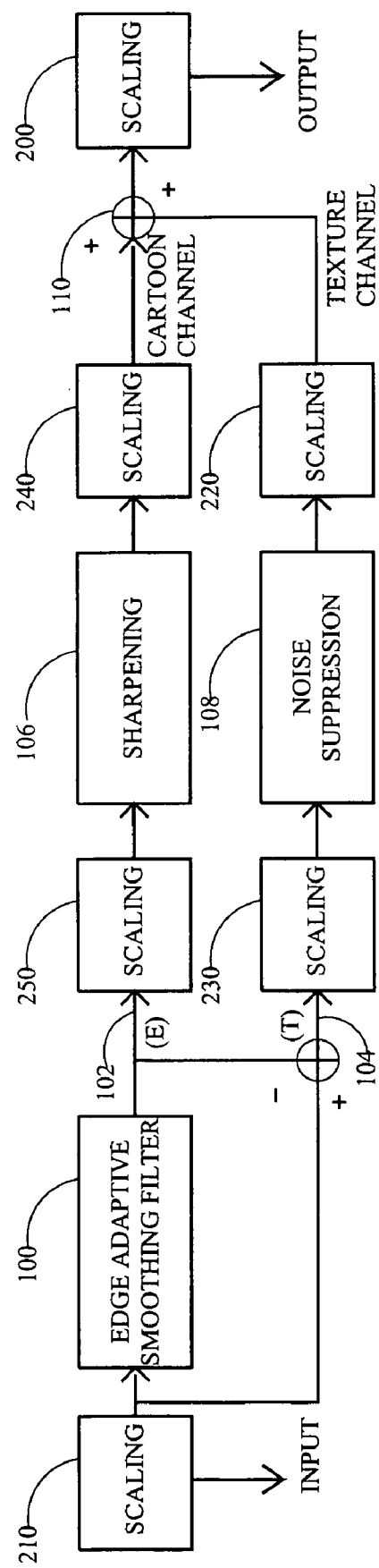
FIG. 6 illustrates another image sharpening with resolution change.

Referring to FIG. 6, depending on the particular implementation requirements, one or more of the scaling operations may be included together with the system. The combination of the different scaling operations achieves a robust design that is readily adaptable to different images and system requirements. It is to be understood that each of the scaling operations may be the same or different. By way of example, the scaling 230 may be a bilinear upscaling operation whereas scaling operation 250 may be a non-linear scaling operation.

More specifically, the edge adaptive smoothing filter 100 applies signal dependent processing to separate strong object edges from fine texture and noises. As one specific example, the system may use bi-lateral filters. One such bilateral filter may be formulated as $$\hat{x}[k] = \frac{\sum_{n=-N}^{N} W[k,n]x[k-n]}{\sum_{n=-N}^{N} W[k,n]},$$

which consists of a weight calculation step and a weighted averaging step. For notational simplicity one may assume a one-dimensional filter but there is no loss of generality in doing that. Here x is the input signal and $\hat{x}$ is the filtered signal and the filter kernel W consists of a spatial kernel $W_s$ and a range kernel $W_R$: $W[k,n]=W_s[k,n]\cdot W_R[k,n]$. Boxcar, gaussian and triangular kernels may likewise be used for kernels. Other techniques, such as anisotropic diffusion and adaptive smoothing may likewise be used. In general, any filter that tends to preserve edge features while reducing noise may be used.

Figure 7:
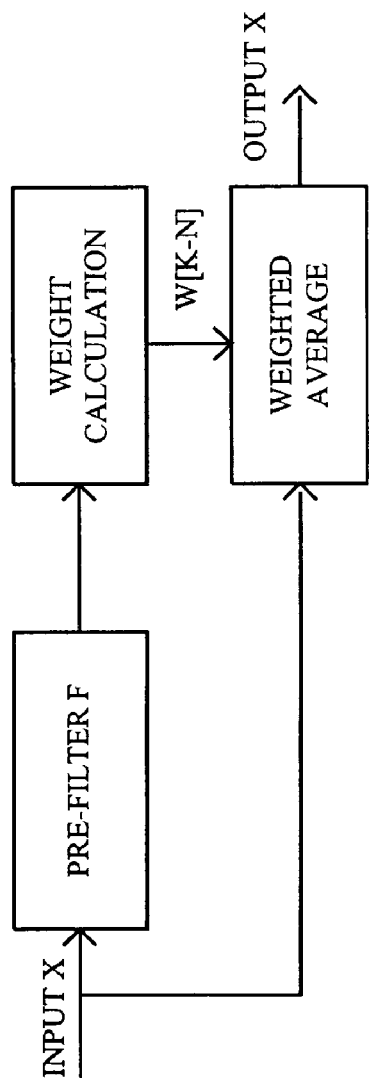
FIG. 7 illustrates bilateral filter with pre-filtering.

The kernel calculation in bilateral filters is signal dependent and serves to differentiate strong object edges from texture/noise/artifact. This is achieved by assigning lower weights to pixels in the filter window whose intensity values are far from the center pixel intensity. Preferably, a pre-filtering step f(x) before the weight calculation is incorporated to achieve better noise and artifact robustness. By reducing the noises and artifacts, the system may improve the weight calculation which in turn improves the filtered outcome. This is illustrated as a block diagram in FIG. 7. Several choices of f may be used, including for example, linear low pass filters and median filters. Other nonlinear smoothing filters can also be applied.

It is desirable to suppress noise in the texture channel. Since the texture channel primarily contains all the noise and artifacts, attenuating the texture channel will suppress the amount of noise and artifacts in the final output. This can be achieved by applying a weight ω to the texture channel, and the weighting can be either spatially invariant or spatially variant. In the case of spatially variant texture channel weighting, the information from the bilateral filter can be leveraged to determine the amount of suppression. More specifically an edge measure $$E[k] = \frac{W[k,0]}{\sum_{n=-N}^{N} W[k,n]}$$

can be derived from the bilateral filter, with higher E values indicating that the current pixel is closer to an edge. Subsequently the texture channel weights can be derived by $\omega[k]=(1-E[k])*\alpha+\beta$. Here $\alpha,\beta$ are introduced to control the range and mean for the texture channel weighing.

It is desirable to suppress coding artifacts in the texture channel. Most of the displayed contents are compressed one way or another, and inevitably contain various compression artifacts. Among those the most visually objectionable is the blocking artifacts due to the non-overlapping block transforms used in most existing compression algorithms. The blocking artifact manifest itself as small square blocks all over the decompressed images, and most noticeably in flat regions. A deblocking filter may be applied on the texture channel to suppress blocking artifacts. The main difference between the texture channel deblocking and a conventional deblocking is that the texture channel is very noisy and the real object edges are not present or not as strong. One may apply the following steps for the deblocking of the texture channel:

First, calculate an edge measure for each pixel by using $$E[k] = \frac{W[k,0]}{\sum_{n=-N}^{N} W[k,n]}$$

and an edge measure for a block by summing up the per-pixel measure.

Second, in the texture channel deblocking process, control the amount of filtering per blocking edge using the edge measure calculated in the previous step. The smaller the edge measure, the stronger the filter is.

Figure 8:
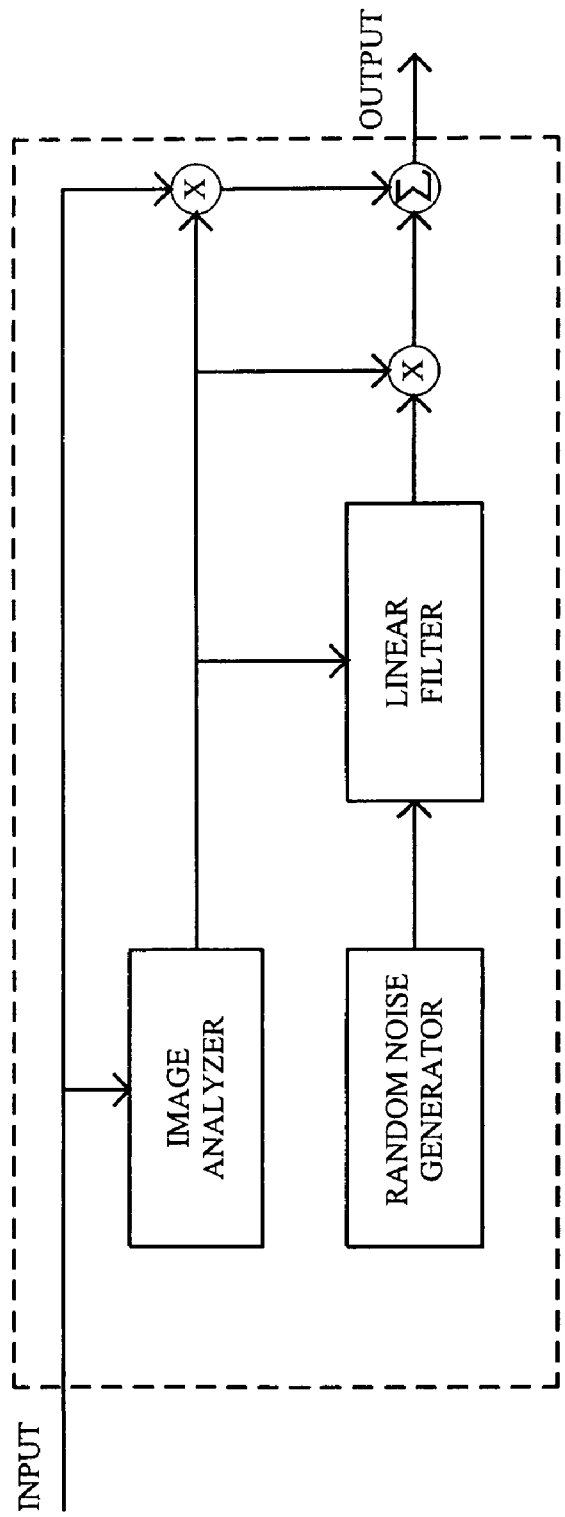
FIG. 8 illustrates comfort noise/texture equalization for noise suppression.

It is desirable to modify the image to provide a sufficient amount of high frequency content so as to have a pleasing appearance. Attenuating the texture channel reduces the noise at the expense of also removing fine detail. This may reduce the perceived sharpness to a human observer, as the resulting output image has less high frequency information than expected. To overcome this issue, texture synthesis may be added to the image to mask structured, coding noise artifacts without reducing high frequency information. A block diagram for the comfort noise is shown in FIG. 8. To be clear, FIG. 8 provides a more detailed description of the noise suppression block shown in FIG. 1.

As can be seen from FIG. 8, the noise suppression process takes the texture channel as input. The texture data is then analyzed by an image analysis process. In one embodiment, the image analyzer extracts the variance and correlation of image regions within the texture channel. Of course, other statistics may be extracted. For example, the location of edges may be identified. By way of example, the mean value of the image region may be extracted.

Outputs from the image analysis block are used to control filtering and multiplication operations. For example, the correlation estimate controls the linear filter shown in FIG. 8. Additionally, the noise power estimate controls the multiplication operator that follows the linear filter output. Furthermore, the mean and edge information is used to control both the multiplication following the linear filter as well as the multiplication of the input data. Finally, the scaled input texture channel and the modified random noise are added and provided as output of the noise suppression component.

In many cases, the non-linear splitting filter will not exactly separate the edges from the textures. Accordingly, some information will leak into each channel from the other channel. Consequently, the adding back together of the two channels may be based upon sensed image characteristics to achieve the final image.

Figure 9:
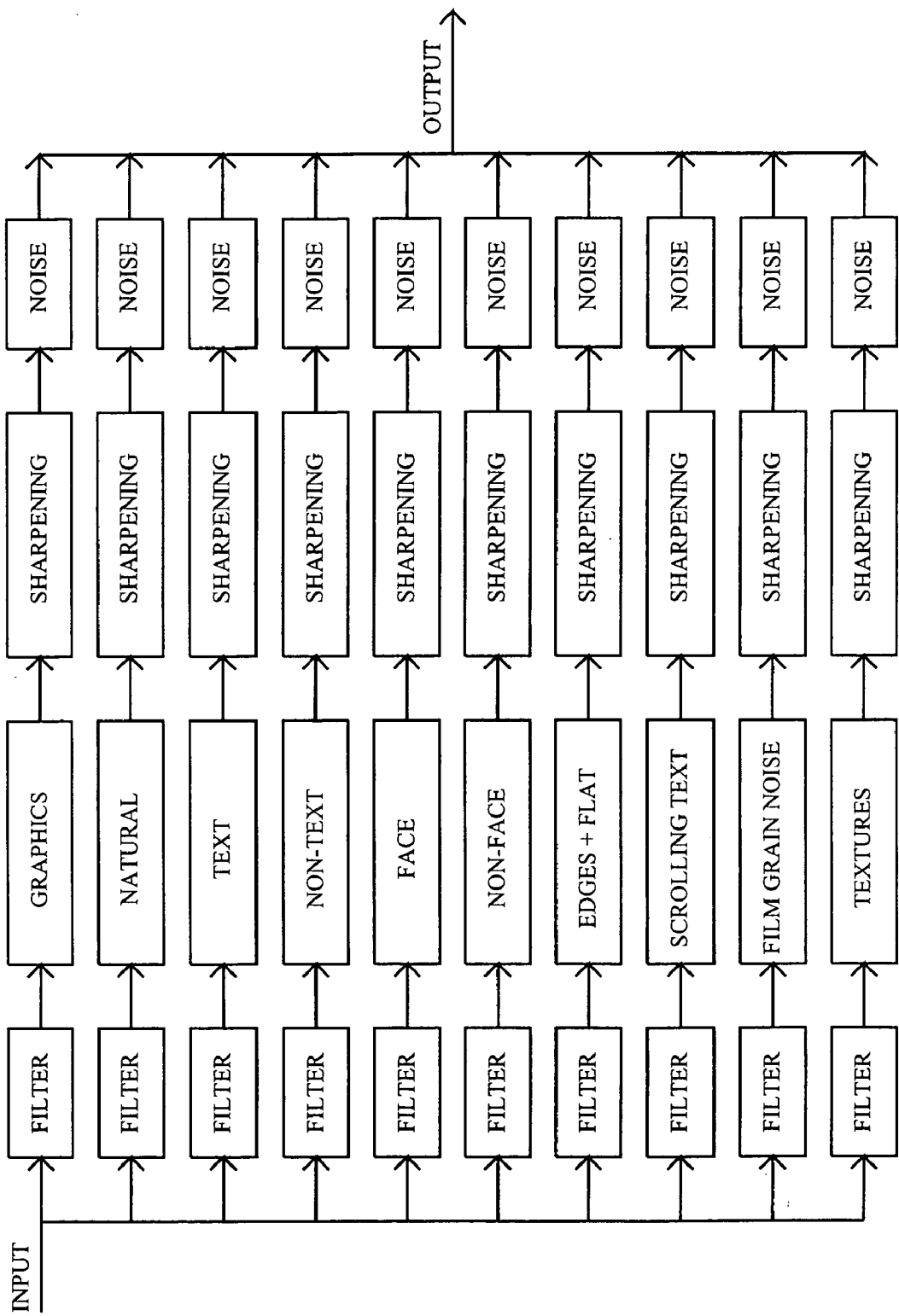
FIG. 9 illustrates another image sharpening with resolution change.

Referring to FIG. 9, a more generalized framework may be used for an improved scaling technique. The technique includes a multi-channel spatial decomposition which may decompose the image into any suitable set of channels. The decomposition may be linear or non-linear. In addition, the spatial decomposition may be more than two channels, if desired. The channels may include characteristics, such as for example, graphics versus natural, text versus non-text, face versus non-face, texture, and edges+flat region, scrolling text, film grain noise. Depending on the particular implementation, the input image for one or more channels may not be filtered but rather scaled in any manner. The channel specific scaling may use any suitable set of filters or omitted. The channel specific noise reduction may use any suitable set of filters or omitted. If desired, the filters may also include temporal information of a video when scaling a particular image. Blending together of the separate channels may be done using any suitable technique.

The upscaling, sharpening, and noise reduction are typically determined based on a two-dimensional moving window whose center moves across every pixel of the input image. To form a 5×5 moving window in an image, the memory used includes buffers having at least 4 consecutive horizontal lines of the image plus 5 pixels. If each horizontal line of the images contains 1920 pixels (full HD), forming a 5×5 window needs to buffer at least 1920*4+5 pixels. A 5×5 window after 2× upscaling needs at least 1920*8+5 pixels, which is about twice as much memory as before upscaling, because each line of the upscaled image now contains 1920*2 pixels after 2× upscaling. Unfortunately, the line buffers are a dominant factor in the overall memory cost of implementing the moving window technique. Accordingly, it is desirable to reduce the line buffers in any particular implementation.

Figure 10:
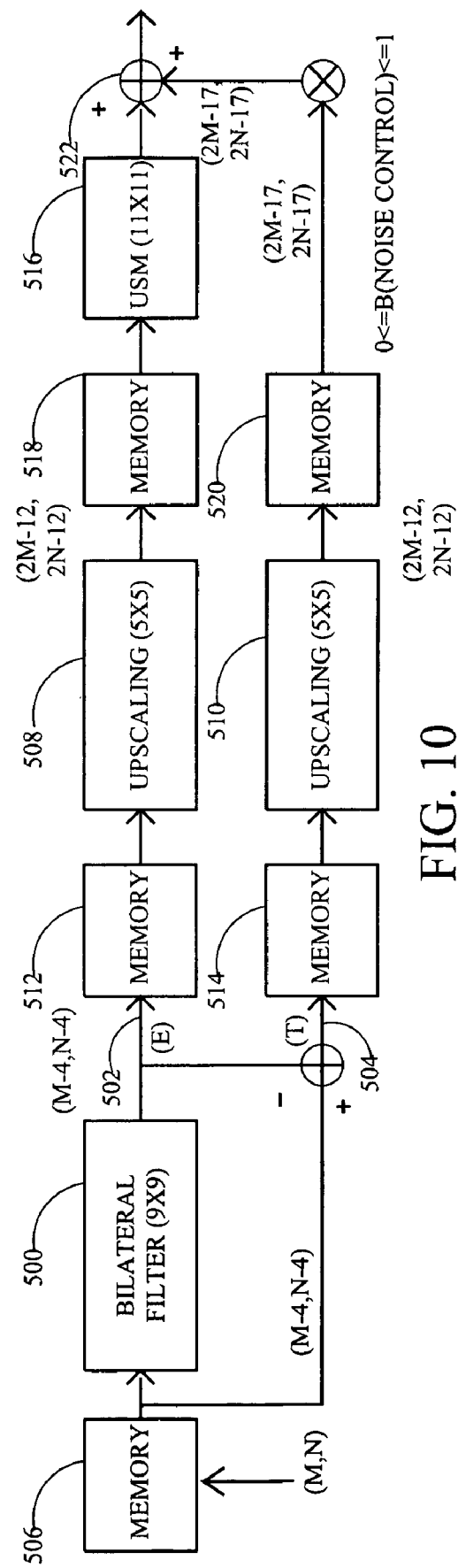
FIG. 10 illustrates a combined upscaling, noise reduction, and edge sharpening technique.

FIG. 10 illustrates a block-diagram that includes a bilateral filter module 500 that decomposes the signal into a baseline channel 502 and a texture channel 504. As previously described, the baseline channel has the low pass and edge components of the signal, and the texture channel has the texture and noise/artifact components of the signal. The bilateral filter module preferably uses a 9×9 window that requires 8 line buffers in memory 506. The two upscaling modules 508 and 510 upscale the baseline and texture channels by a factor of 2, respectively, and each preferably uses a 5×5 window. The respective buffers 512 and 514 each requires 4 line buffers. The unsharp masking (USM) module 516 applies the sharpening function to the baseline channel 502 and preferably uses a 11×11 window that includes 10 line buffers at the 2× resolution which is effectively 20 line buffers at memory 518. An additional memory 520, which has 5 line buffers at the 2×resolution which is effectively 10 line buffers, is used to synchronize the pixels from the baseline and the texture channels before the final adder 522. In total, the memory requirement of this technique counted by pixels is 8*1920+4*1920+4*1920+10*1920*2+5*1920*2=36*1920. This technique has significant memory requirements.

Figure 11:
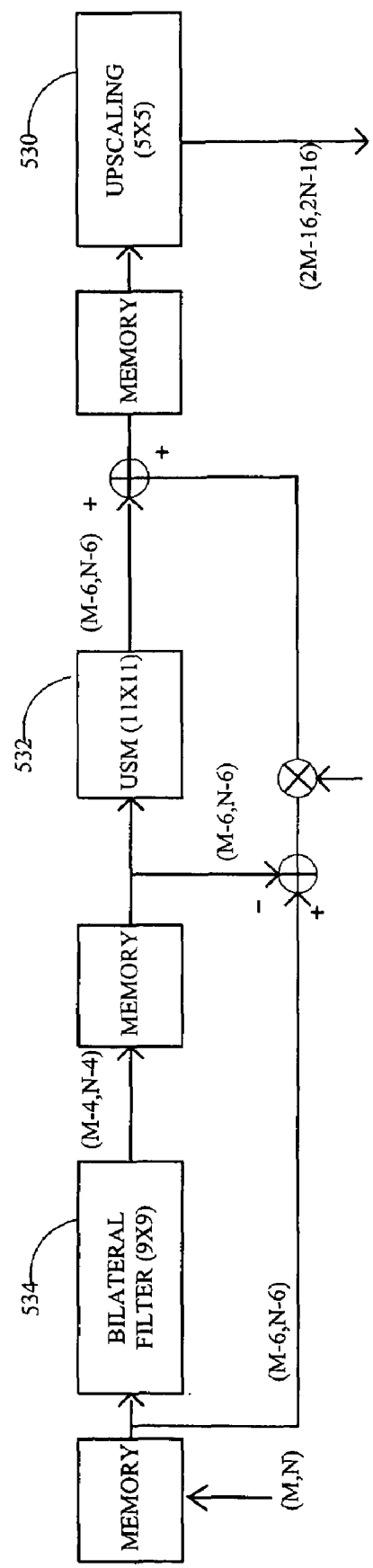
FIG. 11 illustrates another combined upscaling, noise reduction, and edge sharpening technique.

Referring to FIG. 11, an alternative technique to upscaling+noise removal+sharpening is illustrated. In FIG. 11, the upscaling 530 is moved to the last module, and the sharpening 532 and noise control 534 become pre-processing of the upscaling 530. To have the noise control and sharpening performance close to the technique shown in FIG. 10, the bilateral filter may use the same-size 9×9 window that uses 8 line buffers at 1× resolution and the USM 532 may use a much smaller 5×5 window that only uses 4 line buffers at 1× resolution, rather than generally twice as many line buffers at 2× resolution. In addition, there is only one upscaling module in this technique which preferably uses 5×5 window and associated 4 line buffer. In total, the memory requirement of this technique counted by pixels is 8*1920+4*1920+4*1920=16*1920. The memory requirement of this technique is considerably lower than the requirement of the technique illustrated in FIG. 10.

Figure 12:
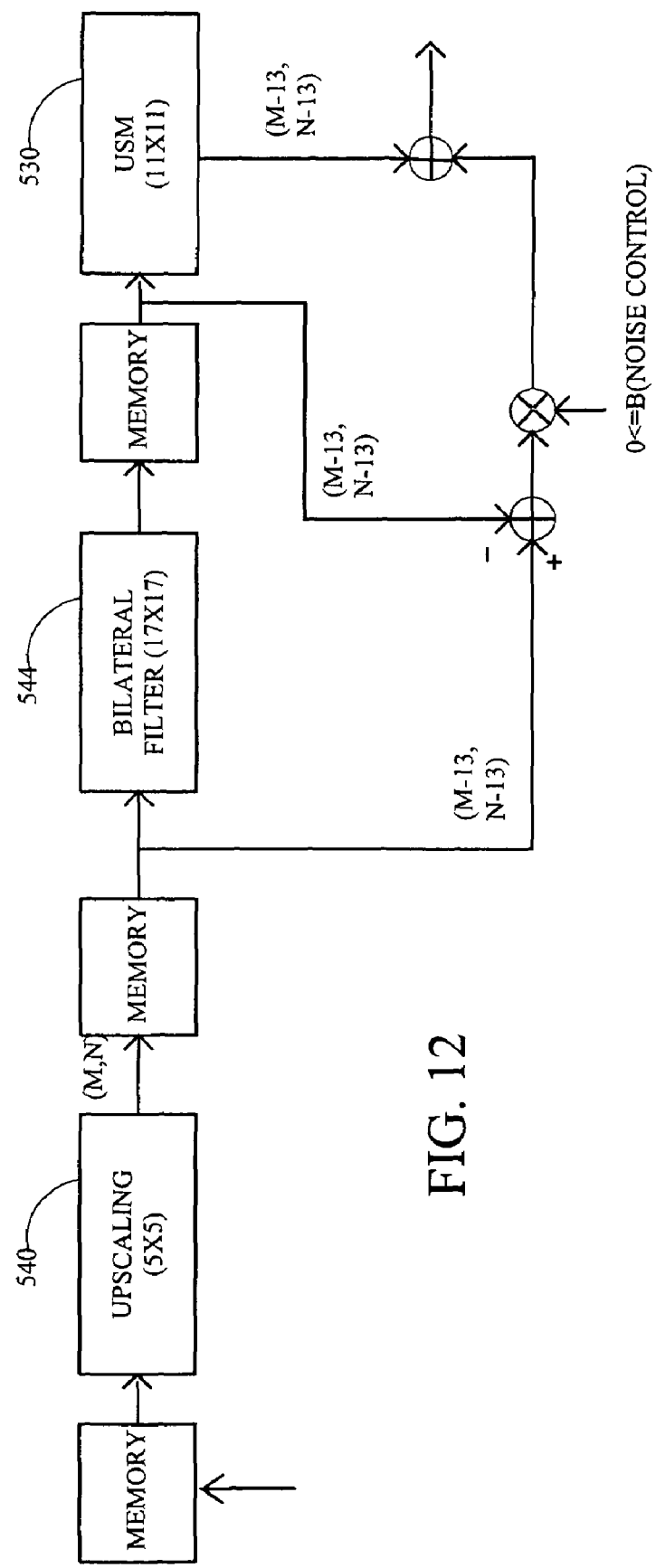
FIG. 12 illustrates a further combined upscaling, noise reduction, and edge sharpening technique.

Referring to FIG. 12, another technique utilizing upscaling+noise removal+sharpening is illustrated. In this technique, the upscaling 540 is the first module, and sharpening 542 and noise control 544 are post-processing of the upscaling 540. To have the noise control 544 and sharpening performance close to the technique shown in FIG. 10, the bilateral filter 544 has a much larger 17×17 window that uses 16 line buffers at 2× resolution; the USM 542 uses a same-size 11×11 window that uses 10 line buffers at 2× resolution; and the upscaling module 540 uses a 5×5 window that uses 4 line buffers at 1× resolution. In total, the memory requirement of this technique counted by pixels is 16*2*1920+10*2*1920+4*1920=52*1920. The memory requirement of this technique is considerably greater than the memory requirement of that illustrated in FIG. 10 and FIG. 11.

While the previously described memory management systems are sufficient, it is preferable to further reduce the memory requirements to reduce the associated expense. Memory reduction may be achieved by performing the upscaling and sharpening using the same memory and/or the same window. To achieve this use of shared memory for upscaling and sharpening, these functions are preferably performed in a generally parallel fashion, rather than in a cascading fashion each of which using its own memory buffer.

Further, the sharpening and noise control may be post-processing to the upscaling, but once again share the same memory buffer with the upscaling, rather than each having its own memory buffer. Thus, by reuse of all or portions of the joint memory buffer for different operations, the memory requirements may be substantially reduced.

Figure 13:
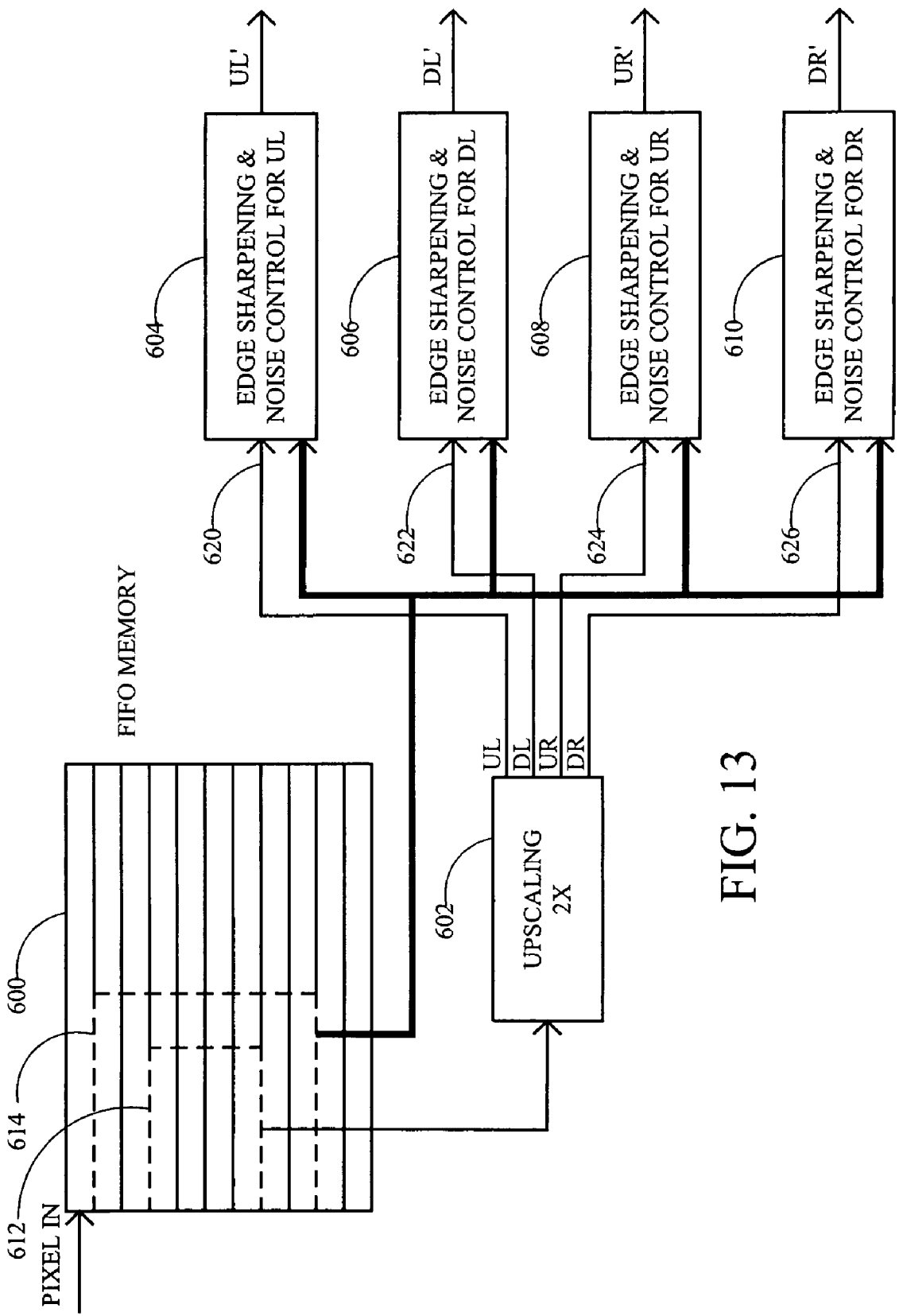
FIG. 13 illustrates a modified combined upscaling, noise reduction, and edge sharpening technique with reduced memory requirements.

Referring to FIG. 13, a block-diagram of one implementation of a memory efficient technique is illustrated. The technique includes a memory 600 that buffers a selected set of scan lines of the image, such as an 8 line buffer. A window within the memory 600 is used as an input to an upscaling module 602, which may upscale by any amount, and preferably by a scale of 2. Preferably, the memory used by the upscaling module 602 is a 5×5 window 612. The same memory 600 may likewise be used for edge sharpening and noise control modules 604, 606, 608, 610. Preferably, the edge sharpening and noise control uses an 8×8 window 614. The edge sharpening and noise control window 614 is preferably larger than the upscaling window 612. Likewise, the edge sharpening and noise control window 614 is preferably overlapping with the upscaling window 612.

Without loss of generality and for the convenience of discussion, the description includes an input having two-dimensional (2-D) raster scanned image that is upscaled by a factor of 2 both horizontally and vertically. The input pixel first passes through a memory 600 that is preferably first-in-first-out.

The upscaling module 602 interpolates four new pixels from an n×n window moving across the input 2-D image. The four new pixels are indexed by up-left (ul) 620, down-left (dl) 622, up-right (ur) 624, down-right (dr) 626, respectively. Each of the four "edge sharpening and noise control" modules 604, 606, 608, 610 sharpens and de-noises each one of these four new pixels from the upscaling module 602, respectively. Accordingly, it may be observed that the pre-upsampled image data is used for upscaling, edge sharpening, and noise control.

Figure 14B:
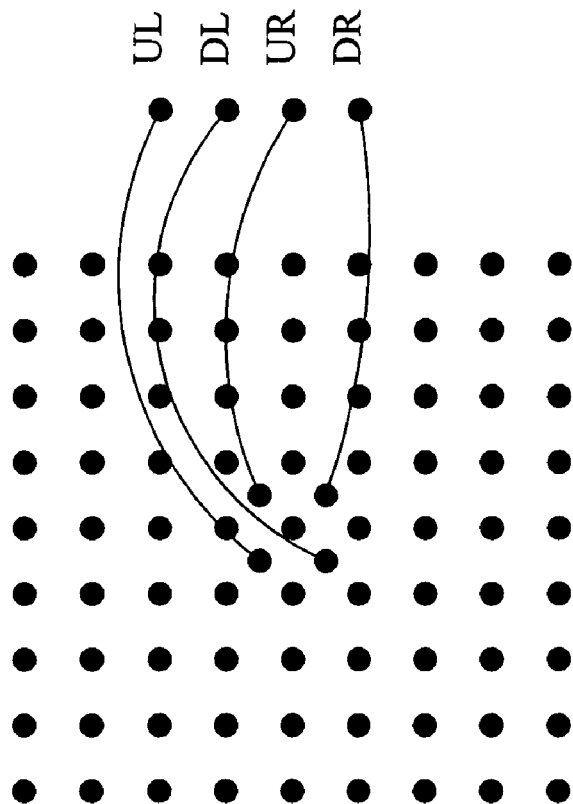
FIGS. 14A and 14B illustrate a pair of different window configurations.
Figure 14A:
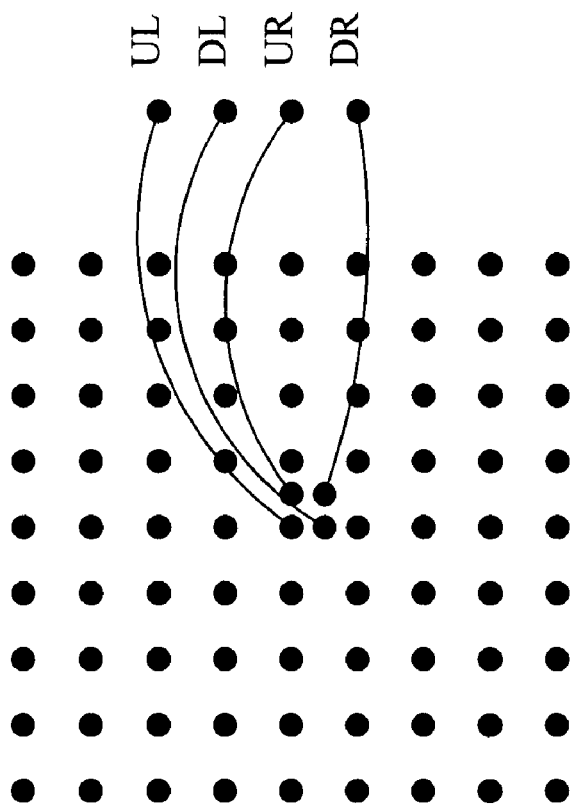

The four new pixels, ul 620, dl 622, ur 624, and dr 626, may have at least two different positions relative to the input pixels, which are illustrated in FIG. 14. As illustrated in FIG. 14(a) position 1 for pixel ul is co-sited with the central pixel of the window. As illustrated in FIG. 14(b) for pixel ul, is ¼ pixel off from the central pixel horizontally and vertically. The different relative positions of the pixels result in different filter coefficients of the bilateral and the lowpass filters in the modules.

The pixels in a window may be indexed by the coordinate system with origin at the central pixel of the window, as illustrated in FIGS. 14(a) and 14(b). The four new pixels ul, dl, ur, dr, generated by the upscaling module may have different indexes for the two positions, namely, position 1: ul: (0, 0), dl: (0, −0.5), ur: (0.5, 0), and dr: (0.5, −0.5)

position 2: ul: (−¼, ¼), dl: (−¼, −¼), ur: (¼, ¼), and dr: (¼, −¼)

It is to be understood that the calculated pixels may be one or more pixels, which likewise may be located at any position.

The upscaling module 602 may interpolate new pixels that are missing in the low-resolution images. The upscaling technique may be any linear or non-linear upscaling technique that uses a selected set of pixels, such as a window with a size less than or equal to 9×9. For example, bi-cubic linear interpolation or edge-directed nonlinear interpolation techniques may be used.

The four edge sharpening and noise control modules 604, 606, 608, 610 sharpen the four new pixels from the upscaling module and likewise reduce their noise level. To perform these functions, the modules may use a window of pixels. In contrast to existing sharpening/noise control techniques that use the pixels after upscaling to form the window, the preferred technique uses the pixels before upscaling to form the window for sharpening and noise reduction after upscaling.

Using pixels before upscaling to form the window for edge sharpening and noise control has advantages over using pixels after upscaling. By way of example, it not only reduces the size of window to ¼ of the size of the window using upscaled pixels, but also facilitates sharing the window that the upscaling module uses. It is appropriate to form this window using pixels before upscaling. Upscaling either does not add any new information or just adds a small amount of new information that makes little contribution to sharpening and noise control and can be effectively ignored. For example, many linear upscaling approaches can be seen as a different approximation of the sinc function-based upscaling approach. In the frequency domain, the image after the sinc function-based linear upscaling has the same frequency components as the image before upscaling. The new pixels interpolated by the sinc function-based linear upscaling approach do not provide any new information. Experiments also confirm that forming the window from pixels after upscaling and forming the window from pixels before upscaling have minimal effect on the sharpening and noise control performance.

There are preferably four "edge sharpening and noise control" modules 604, 606, 608, 610. The module responsible for pixel ul, is illustrated in detail in FIG. 15, and will be discussed in detail in the following paragraphs. The rest three modules may have the same structure as the ul module but different filter coefficients due to the different positions of new pixels.

The "edge sharpening and noise control" module is based on linear lowpass filter and nonlinear bilateral filter. Mathematically, the input and output relationship of this module may be described as $$y^{ul} = \underbrace{\alpha * (y_{sv1}^{ul} - y_{lp}^{ul})}_{\text{edge sharpening}} + \underbrace{\beta * (x^{ul} - y_{sv2}^{ul})}_{\text{noise control}} + y_{sv2}^{ul} \qquad \text{Equation (1)}$$

where $x^{ul}$ is the input new pixel generated by the upscaling module, $y_{sv2}^{ul}$ is the output of the bilateral filter 2, $y_{sv1}^{ul}$ is the output of the bilateral filter 1, and $y_{lp}^{ul}$ is the output of the linear lowpass filter.

$y^{ul}$ is the output of this module.

The two parallel sub-modules of the ul module, noise control is utilized by the first term in equation (1), and edge sharpening is utilized by the second term in equation 1. The two sub-modules are parallel, sharing the same 9×9 window.

The first term in equation (1) is the scaled difference between the linear lowpass filtered result $y_{lp}^{ul}$ and the nonlinear bilateral filtered result $y_{sv1}^{ul}$. The scaling factor determines the sharpening effect. The linear lowpass filter smoothes both noise and edges. The nonlinear bilateral filter, on the other hand, only smoothes noise but preserves edges. Therefore, the difference between their results contains primarily edge information. Scaling up this difference has the effect of sharpening edges.

The lowpass filtering, the bilateral edge-preserving filtering, and their difference are conceptually illustrated by a simple 1D signal in FIG. 16. FIG. 16(a) illustrates a 1D signal that contains a soft edge and random Gaussian noise (5% of the signal strength). FIG. 16(b) shows the signal that has been processed by a 11-tap bilateral filter, where the noise is removed but the sharpness of the edge is preserved. FIG. 16(c) shows the signal that has been processed a 11-tap linear filter, where the noise is removed and the edge is softer. FIG. 16(d) shows the difference between (b) and (c), in which noise is cancelled out each other and two strong spikes survives.

The preferred linear lowpass filter and bilateral filter 1 are below. The coefficients of the filters are different in the two cases where the pixels interpolated from the upscaling module have two different positions relative to the input pixels.

Position 1 (new pixel ul has the coordinates of (0, 0), FIG. 14(a)):

The new pixel ul does not need to be generated, i.e., $x^{ul}=x_{0,0}$.

The linear lowpass filter is $$y_{lp}^{ul} = \frac{1}{Z_{lp}^{ul}} \sum_{i=-N}^{N} \sum_{j=-N}^{N} (w_{i,j}^{ul} x_{i,j}), \qquad \text{Equation (2)}$$

where $w_{i,j}^{ul}$ are the filter coefficients, and $x_{i,j}^{ul}$ are the pixels in the window. The window is defined by N and the window size is 2N+1 by 2N+1. The normalization factor is $Z_{lp}^{ul} = \Sigma w_{i,j}^{ul}$.

The filter coefficients $w_{i,j}^{ul}$ in equation (2) are derived from a 2-D Gaussian kernel centered at the pixel ul, which has the coordinates of (0,0):

$$w_{i,j}^{ul} = \exp(-(i^2/2\sigma_1^2 + j^2/2\sigma_1^2)). \qquad \text{Equation (3)}$$

Note that one may drop the normalization factor in equation (3) that usually exist in a Gaussian kernel.

The bilateral filter 1 is $$y_{sv1}^{ul} = \frac{1}{Z_{sv1}^{ul}} \sum \sum (w_{i,j}^{ul} v_{i,j} x_{i,j}), \qquad \text{Equation (4)}$$

where the normalization factor is $Z_{sv1}^{ul} = \Sigma w_{i,j}^{ul} v_{i,j}$.

In equation (4), $w_{i,j}^{ul}$ are same as the coefficients in equation (2), which are defined by equation (3), and are called spatial coefficients in the bilateral filter.

In equation (4), $v_{i,j}$ are called range coefficients, and are defined on amplitude difference with pixel ul:

$$v_{i,j} = \exp(-(x_{i,j} - x_{0,0})^2 / 2\sigma_R^2). \qquad \text{Equation (5)}$$

Equation (5) is a 1-D Gaussian kernel without the normalization factor. This Gaussian kernel may be referred to as a range kernel, and the Gaussian kernel in equation (3) may be referred to as a spatial kernel.

Position 2 (new pixel ul has the coordinates of (−¼,¼), FIG. 14(b):

The new pixel ul is generated.
The linear lowpass filter is $$y_{lp}^{ul} = \frac{1}{Z_{lp}^{ul}} w_{ul}^{ul} x^{ul} + \frac{1}{Z_{lp}^{ul}} \sum \sum (w_{i,j}^{ul} x_{i,j}), \qquad \text{Equation (6)}$$

where the normalization factor is $Z^{ul} = w_{ul}^{ul} + \Sigma w_{i,j}^{ul}$.

The filter coefficients in equation (6) are derived from a 2-D Gaussian kernel centered at position ul, which is the same as the previous case. However, because position ul is at (−¼, ¼), not (0, 0), the kernel is different from equation 3:

$$w_{i,j}^{ul} = \exp(-((i+¼)^2/2\sigma_1^2 + (j-¼)2/\sigma_1^2)) \qquad \text{Equation (7)}$$

and $w_{ul}^{ul} = 1$.

The bilateral filter 1 is $$y_{sv1}^{ul} = \frac{1}{Z_{sv1}^{ul}} w_{ul}^{ul} x^{ul} + \frac{1}{Z_{sv1}^{ul}} \sum_{i=-N}^{N} \sum_{j=-N}^{N} (w_{i,j}^{ul} v_{i,j} x_{i,j}), \qquad \text{Equation (8)}$$

where the normalization factor of bilateral filter is $$Z_{sv1}^{ul} = w_{ul}^{ul} + \Sigma w_{i,j}^{ul} v_{i,j}.$$

In equation (8), spatial coefficients $w_{i,j}^{ul}$ are the same coefficients in equation (6) and defined by equation (7).

In equation (8), range coefficients $v_{i,j}$ are defined as $$v_{i,j} = \exp(-(x_{i,j} - x^{ul})^2 / 2\sigma_R^2). \qquad \text{Equation (9)}$$

The sharpening effect is controlled by a user-adjustable α, which is multiplied to the difference. To obtain a sharpening effect, α should be bigger than 1.

Figure 15:
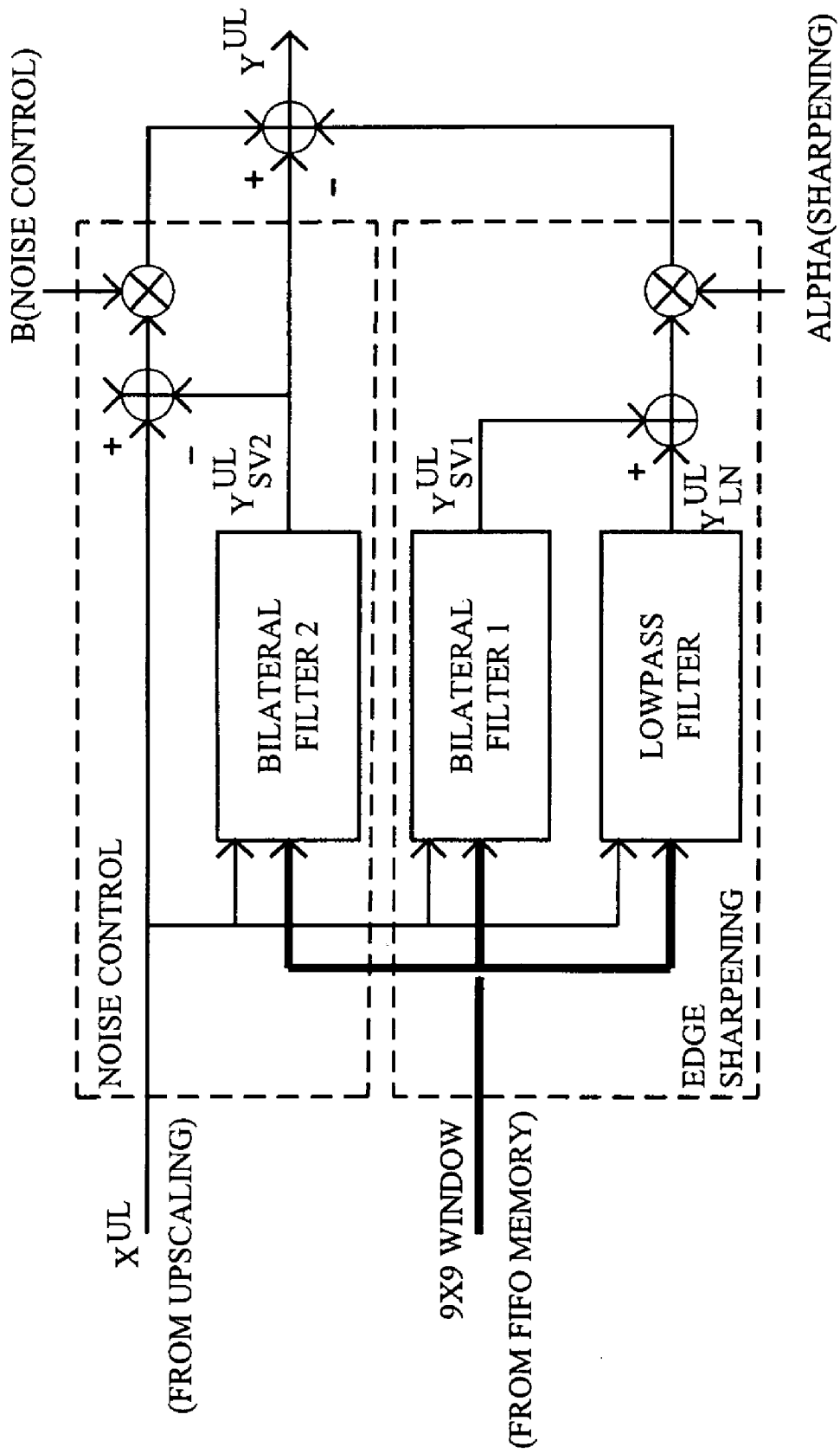
FIG. 15 illustrates an edge sharpening and noise control module suitable for use with FIGS. 14A and 14B.
Figure 16A:
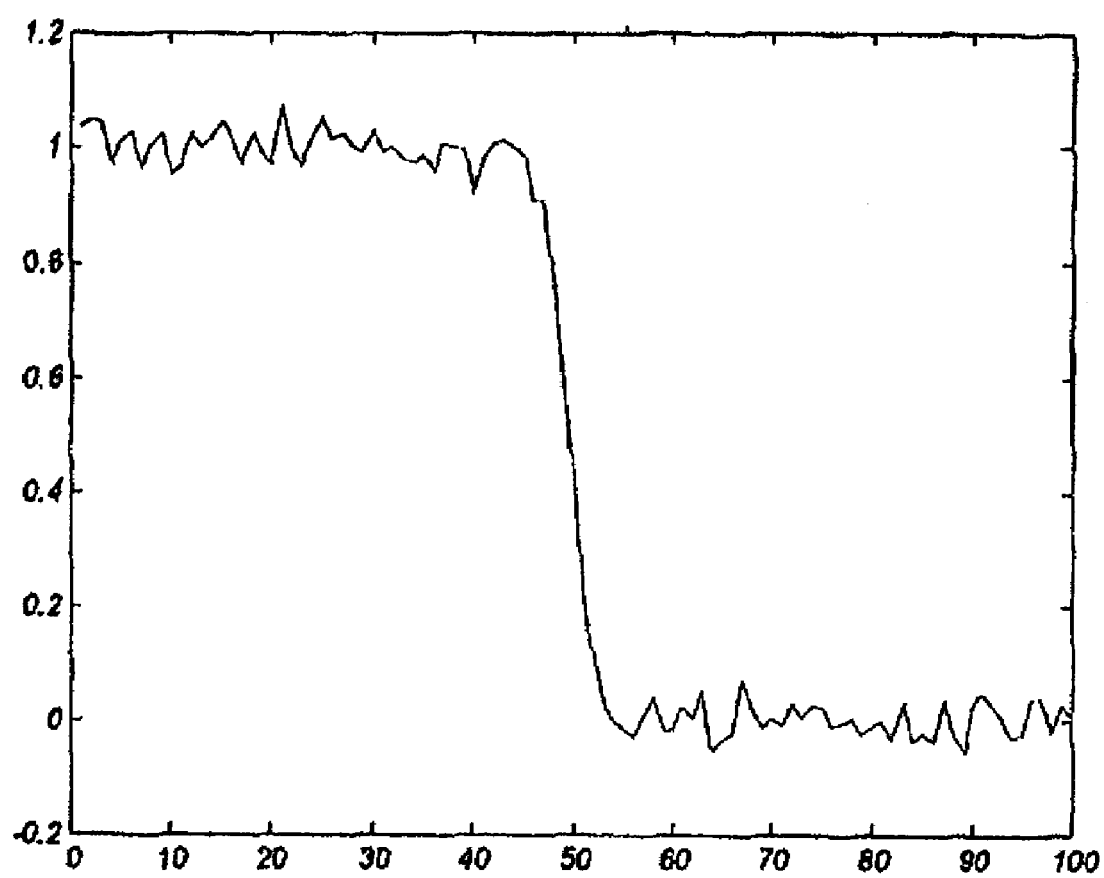
FIG. 16 illustrates the sharpening technique of FIG. 15.
Figure 16B:
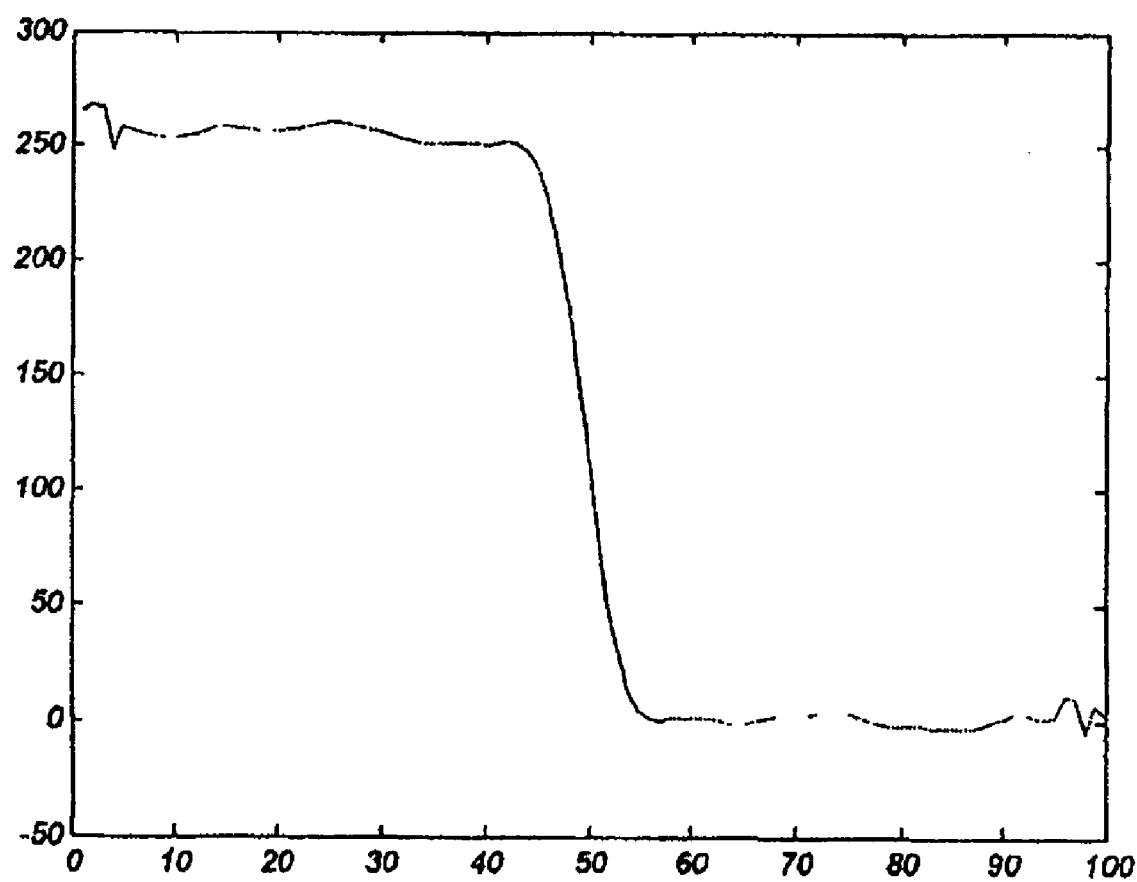
Figure 16C:
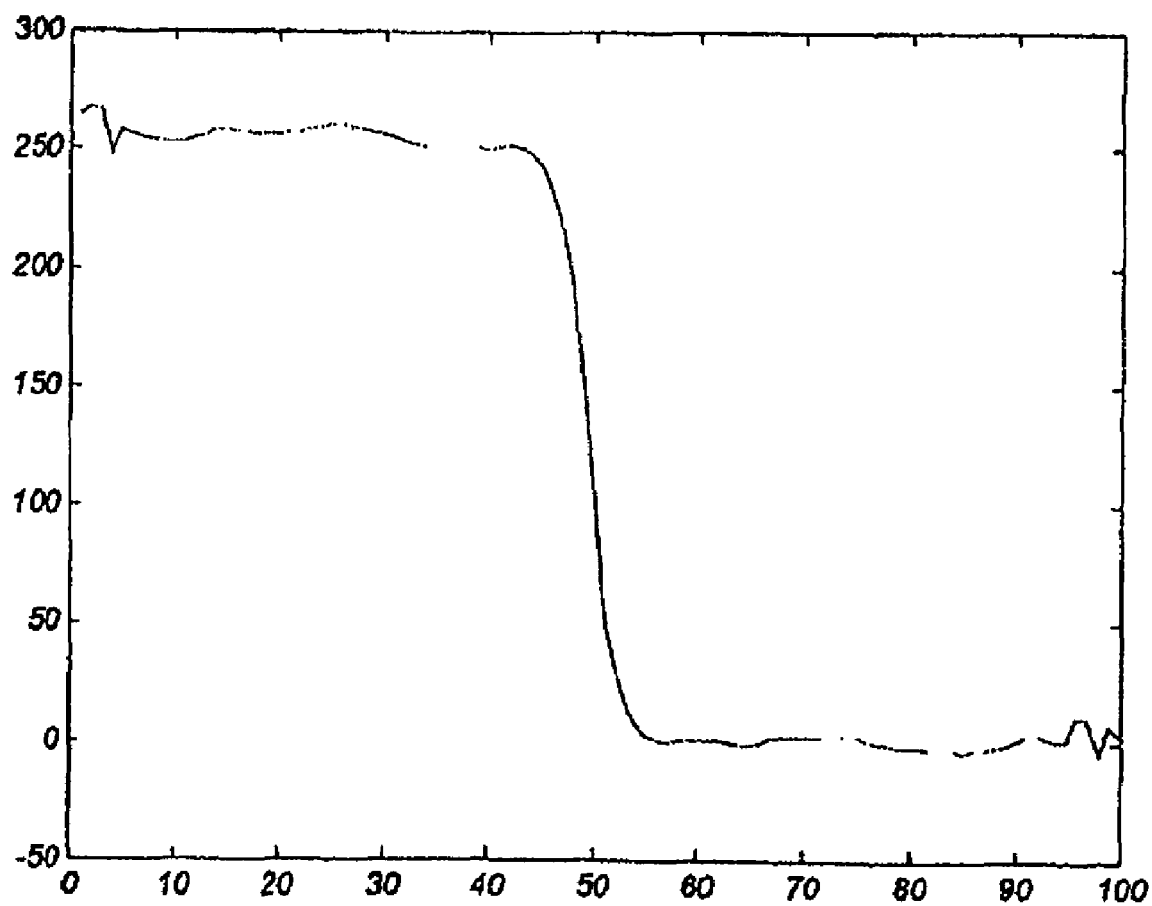
Figure 16D:
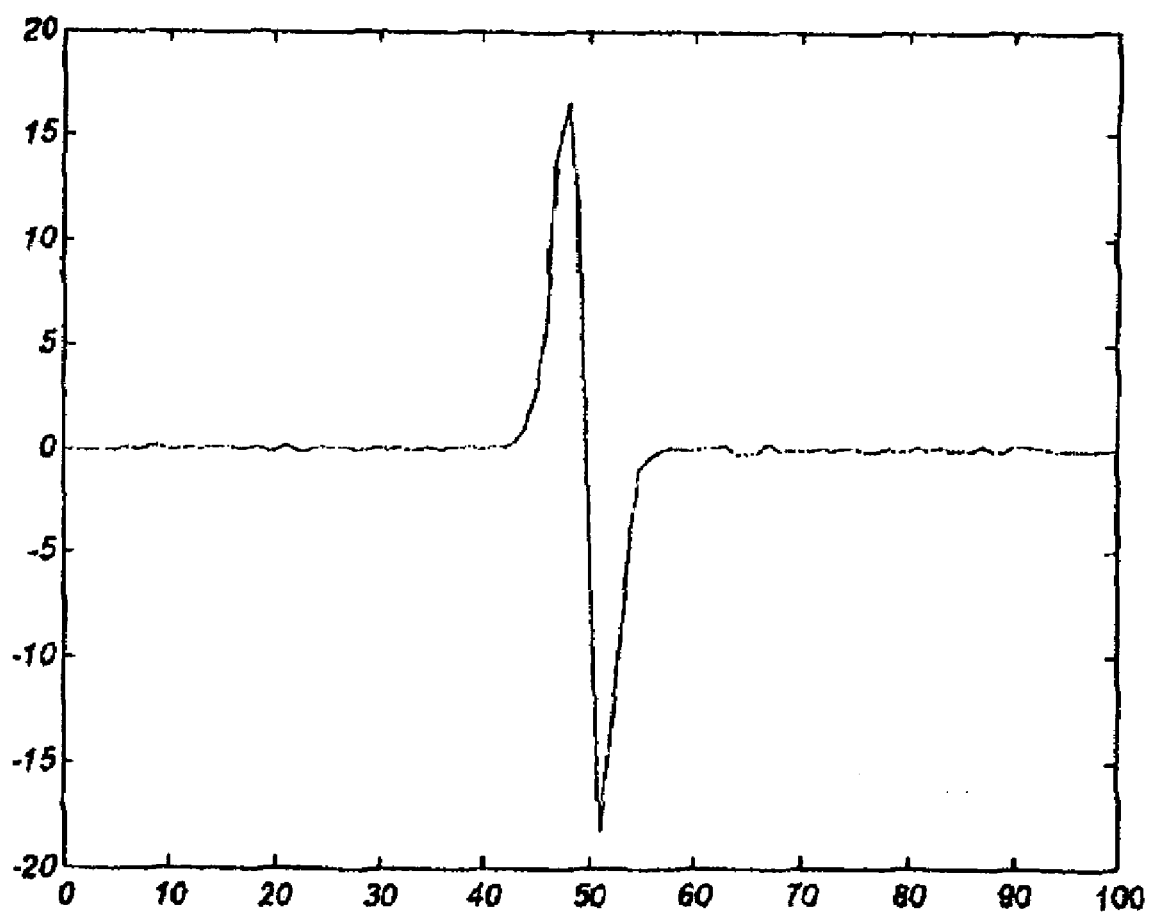
Figure 17A:
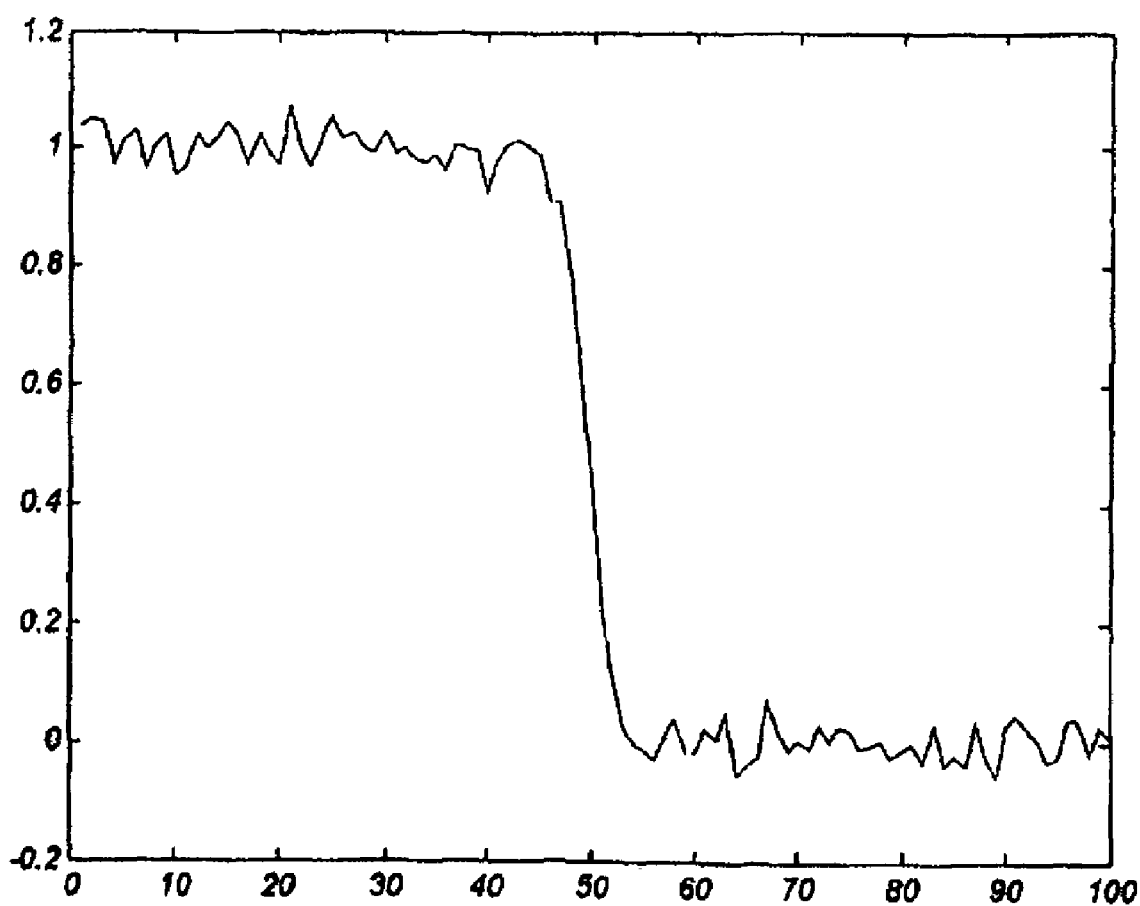
FIG. 17 illustrates the noise control technique of FIG. 15.
Figure 17B:
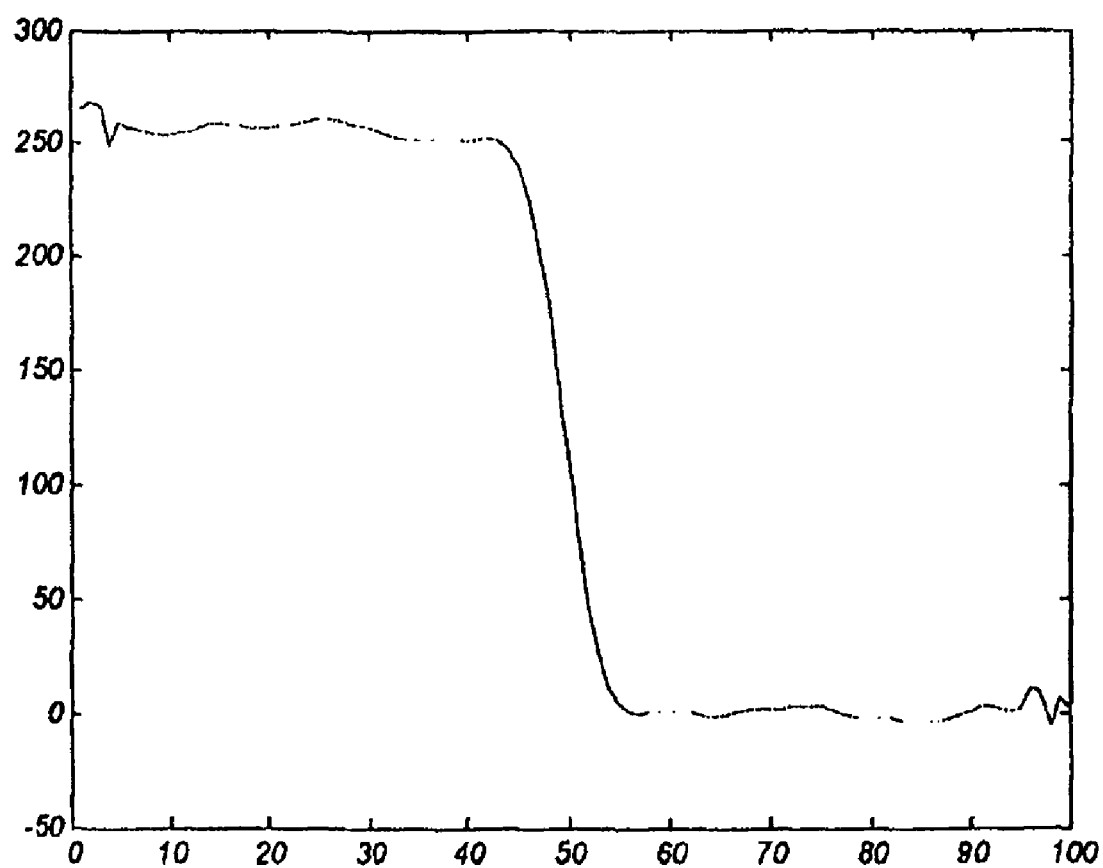
Figure 17C:
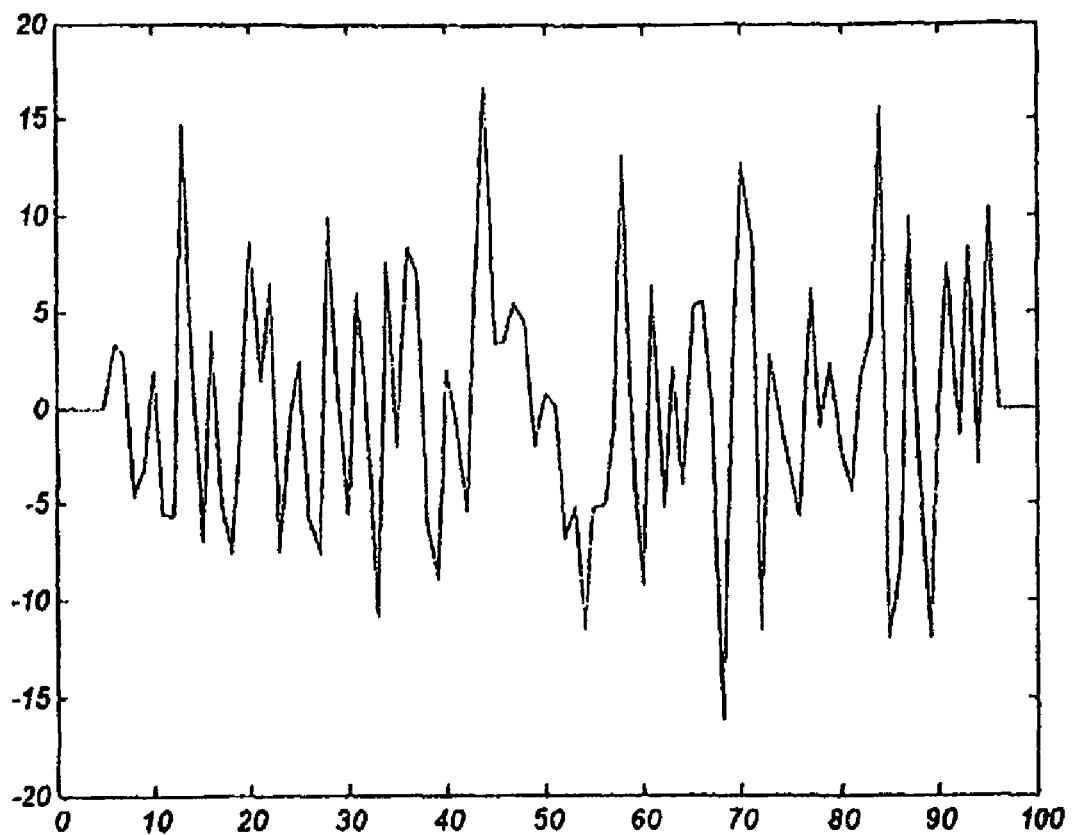
Figure 17D:
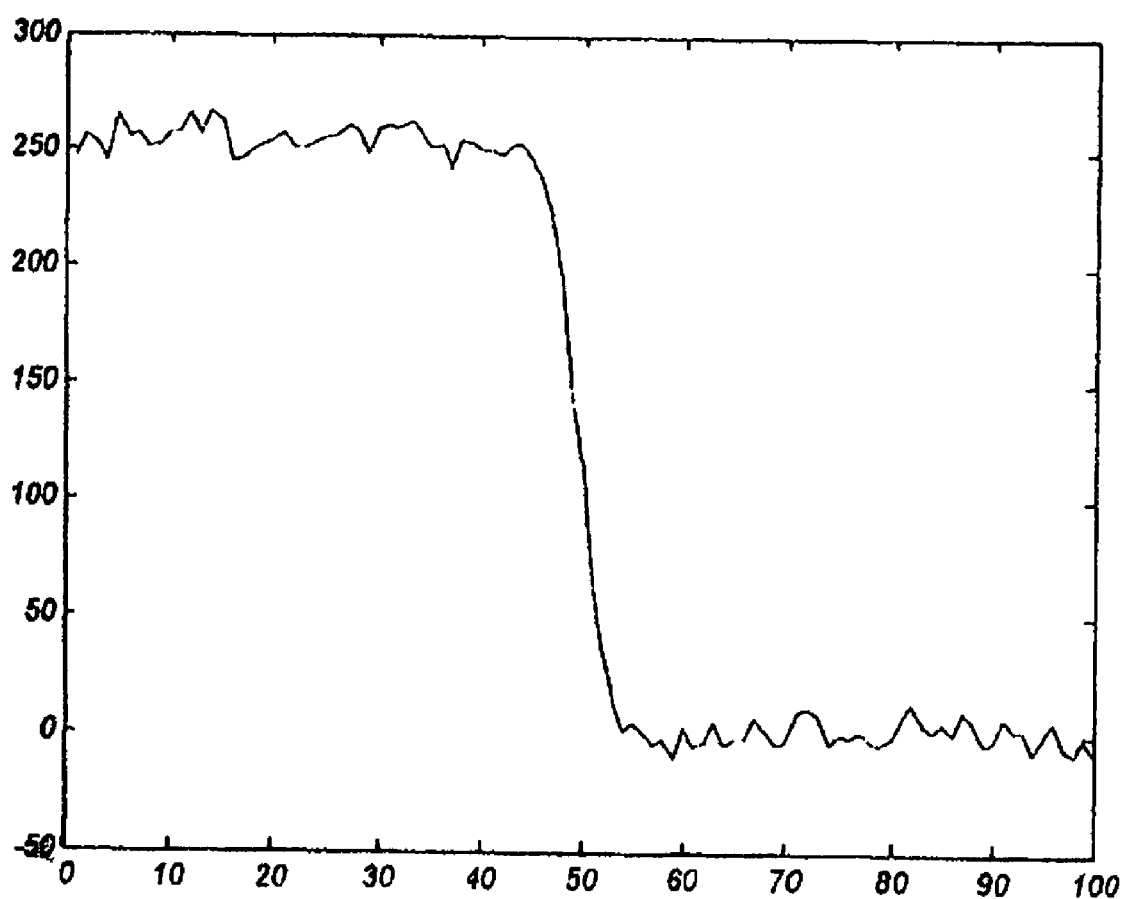

Noise control may be performed by the second term in equation (1), in which $y_{sv2}^{ul}$ is the output of the bilateral filter 2 in the block-diagram in FIG. 15. The second term in equation (1) shows that $y_{sv2}^{ul}$ is used as the baseline, and β controls how much detail and/or noise are added back. β is between 0 and 1. When β is 0, all the difference is not added back; when β is 1, the difference is fully added back.

Noise control is illustrated in FIG. 17. FIG. 17(a) illustrates the input 1D signal. FIG. 17(b) illustrates $y_{sv2}^{ul}$ which due to edge-preserving property of the bilateral filter, $y_{sv2}^{ul}$ only contains the edge information with the noise and detail totally removed. FIG. 17(c) is $x^{ul} - y_{sv2}^{ul}$. $x^{ul} - y_{sv2}^{ul}$ which contains the noise that $y_{sv2}^{ul}$ does not contain. FIG. 17(d) is the result with noise suppressed by $\beta(x^{ul} - y_{sv2}^{ul}) + y_{sv2}^{ul}$ with β=0.5.

The bilateral filter 2, mathematically described in the following paragraphs, has a different spatial kernel from the bilateral filter 1. Again, the bilateral filter 2 has different coefficients in the two cases where the two different positions of the new pixels relative to the input pixels.

Position 1 (new pixel ul has the coordinates of (0, 0), FIG. 14(a):

The new pixel ul does not need to be generated, i.e., $x^{ul} = x_{0,0}$.

The bilateral filter 2 is $$y_{sv2}^{ul} = \frac{1}{Z_{sv2}^{ul}} \sum \sum (u_{i,j}^{ul} r_{i,j} x_{i,j}), \qquad \text{Equation (10)}$$

where the normalization factor is $Z_{sv2}^{ul} = \Sigma u_{i,j}^{ul} r_{i,j}$.

The spatial coefficients $u_{i,j}^{ul}$ are derived from a 2-D Gaussian kernel centered at the pixel ul, with coordinates (0,0):

$$u_{i,j}^{ul} = \exp(-(i^2/2\sigma_2^2 + j^2/2\sigma_2^2)). \qquad \text{Equation (11)}$$

The range coefficients $r_{i,j}$ are same as the bilateral filter 1, defined by equation (5).

While the range kernel of the bilateral filter 2 is the same as the range kernel of the bilateral filter 1, the spatial kernel in equation (11) is different from the spatial kernel of the bilateral filter 1.

Position 2 (new pixel ul has the coordinates of (−¼,¼), FIG. 14(b):

The new pixel ul needs to be generated.

The bilateral filter 2 is $$y_{sv1}^{ul} = \frac{1}{Z_{sv2}^{ul}} u_{ul}^{ul} x^{ul} + \frac{1}{Z_{sv2}^{ul}} \sum_{i=-N}^{N} \sum_{j=-N}^{N} (u_{i,j}^{ul} r_{i,j} x_{i,j}).$$ (5)

The spatial coefficients $ur_{i,j}^{ul}$ are derived from a 2-D Gaussian kernel centered at the pixel ul, with coordinates $(-\frac{1}{4}, \frac{1}{4})$:

$$w_{i,j}^{ul} = \exp(-((i+\frac{1}{4})^2/2\sigma_1^2 + (j-\frac{1}{4})^2/2\sigma_1^2)).$$

The range coefficients $r_{i,j}$ are same as the bilateral filter 1, defined by equation (9). To further simplify the implementation, the bilateral filter 2 may be replaced by a linear filter with the same spatial coefficients as in the bilateral filter 2.

Figure 18A:
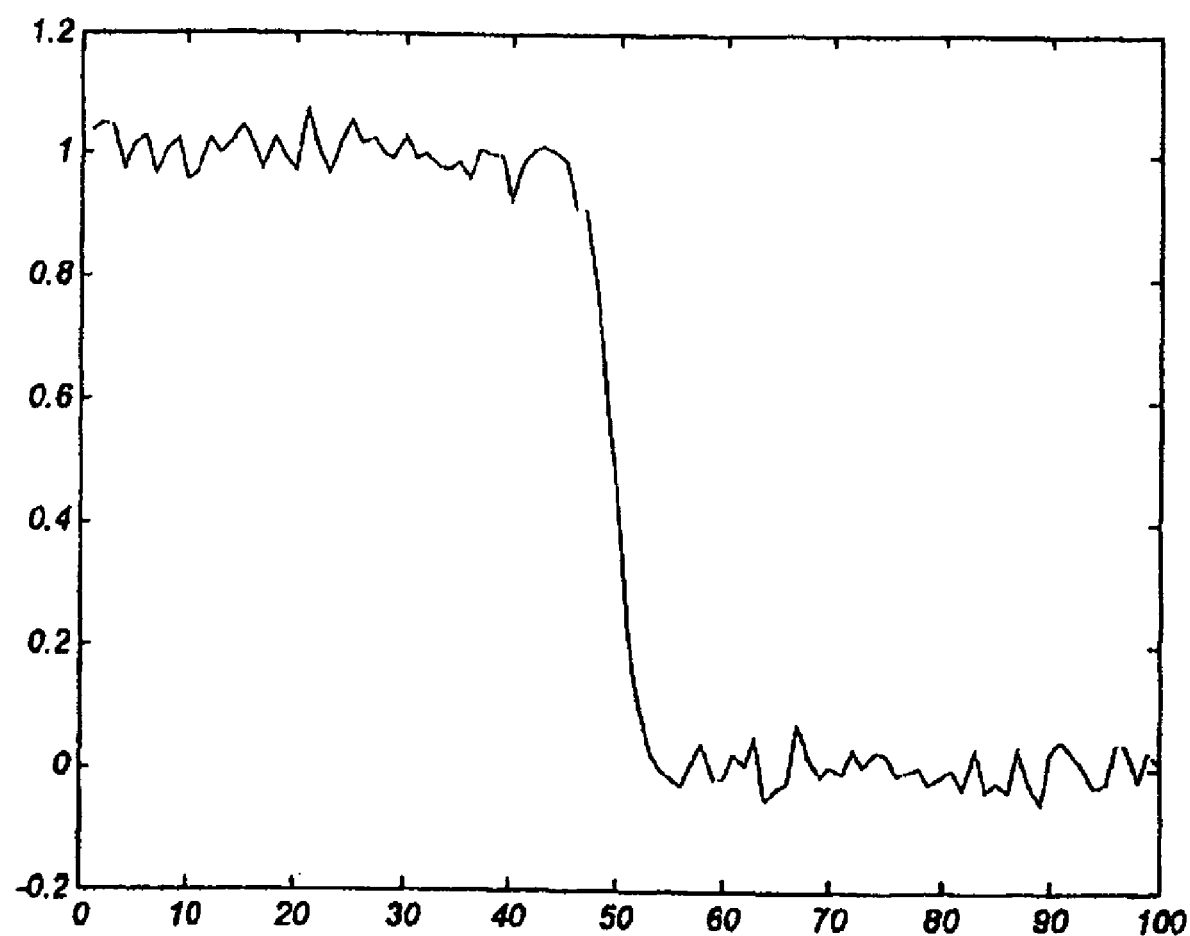
FIG. 18 illustrates the result of sharpening and noise control of FIG. 15.
Figure 18B:
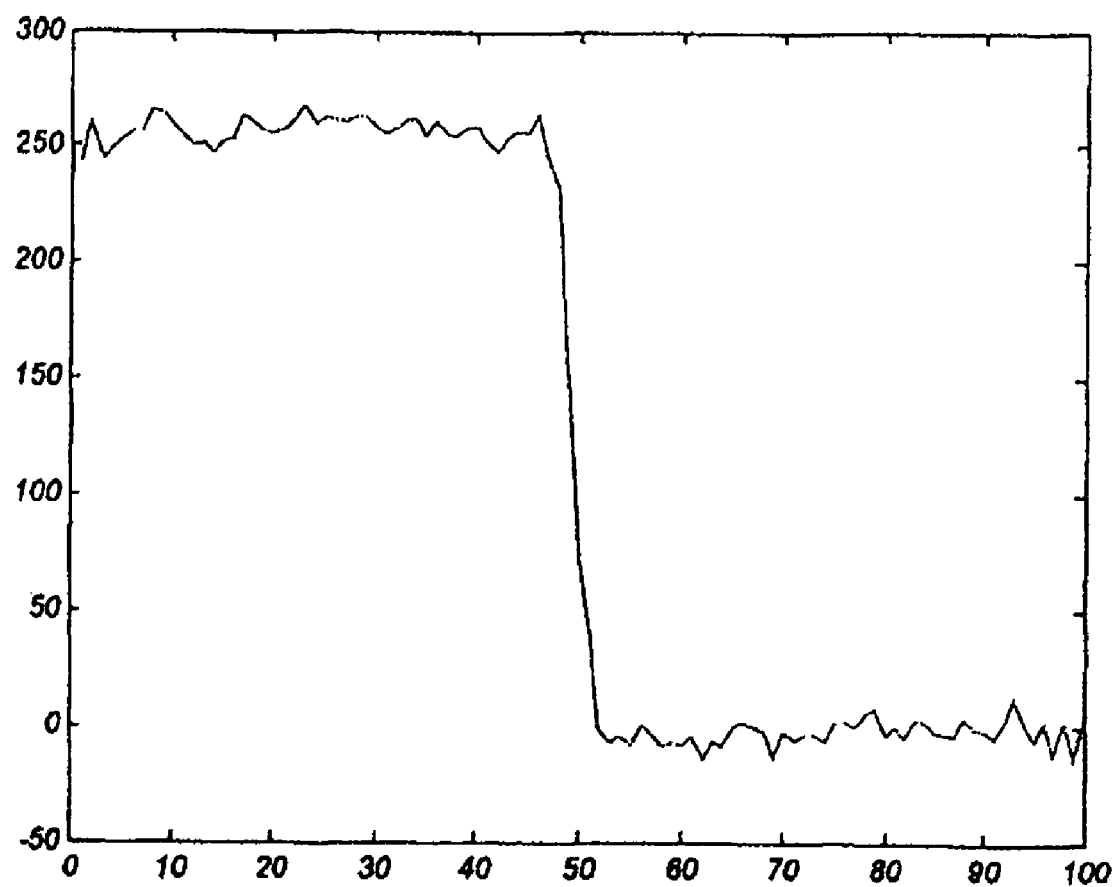

Overall, the "sharpening and noise control" module is conceptually illustrated by the simple 1D signal in FIG. 18.

The previous description relates to the "sharpening and noise control" module for pixel ul. The modules for the other three pixels ur, dl, and dr have the same structure. The difference is the spatial kernels that define the spatial coefficients of the three filters (lowpass filter, bilateral filter 1 and 2) are centered at ur, dl, and dr, respectively. In summary, there are total four linear filters, four bilateral filter 1 and four bilateral filter 2 in the four modules. Their spatial coefficients are based on the Gaussian kernels with the same $\sigma_1/\sigma_2$ but different centers. The range coefficients are based on the same Gaussian kernel, as a consequence the two kernels can share the same look-up table in an implementation.

In the above preferred embodiment of the edge sharpening and noise control module, the three filters take two kinds of inputs: low-resolution pixels in the local window and the co-located hi-resolution pixel. In the particular case show in FIG. 15, the new pixel $x^{ul}$ as well as the pixels in the low-resolution 9×9 window are involved in the generation of $y^{ul}$. Those input pixels are treated as irregularly spaced samples on the high-resolutional grid in the filtering, for both bilateral filters and the low-pass filter. Based on the same design principle, many variations and extensions may be done.

By way of example, only low-resolutional pixels may be used for filtering. In the special case that the high-resolutional pixels are interpolated by a linear upscaler, low-resolutional input pixels are sufficient for equivalent filtering. Multiple high-resolutional pixels may be used for filtering. For example, neighboring non-colocated high-resolutional pixels $\{x^{ur}, x^{dl}, x^{dr}\}$, as well as $x^{ul}$, may be used in the generation of $y^{ul}$.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying an image from a first scale to a modified image having a different scale:
   (a) receiving said image having a first sharpness at said first scale;
   (b) filtering said image with an image filter to result in the creation of a first channel and a second channel, wherein said first channel includes primarily texture information and said second channel includes primarily edge and flat region information;
   (c) filtering said first channel to attenuate higher frequency content of said image in said first channel;
   (d) filtering said second channel to sharpen said image in said second channel, where the filtered said second channel is at said first scale;
   (e) upscaling said image from said first scale to said second scale, wherein said upscaling, said filtering of said second channel, and said filtering of said first channel are based upon a plurality of the same pixels of said image from the same buffer;
   (f) combining said first channel, said second channel, and said image upscaled to said second scale to form said modified image having said different scale.

2. The method of claim 1 wherein said image filter is a non-linear filter.

3. The method of claim 2 wherein said non-linear filter is an adaptive filter.

4. The method of claim 3 wherein said adaptive filter is edge adaptive.

5. The method of claim 1 wherein the size of a window used for said upscaling is less than the size of a window used for at least one of said filtering of said first channel and said filtering of said second channel.

6. The method of claim 5 wherein said upscaling and said image filters are based upon at least some of the same pixels in a buffer.

7. A method for modifying an image from a first scale to a modified image having a different scale:
   (a) receiving said image having a first sharpness at said first scale;
   (b) upscaling said image from said first scale to said second scale;
   (c) filtering said image with an image filter to result in the creation of a first channel and a second channel further based said upscaled said image and said image, wherein said first channel includes primarily texture information and said second channel includes primarily edge and flat region information, and filtering said first channel to attenuate higher frequency content of said image in said first channel while filtering said second channel to sharpen said image in said second channel;
   (d) combining said first channel and said second channel to form said modified image having said different scale.

8. The method of claim 7 wherein said upscaling, said filtering of said second channel, and said filtering of said first channel are based upon a plurality of the same pixels of said image from the same buffer.

9. The method of claim 7 wherein the size of a window used for said upscaling is less than the size of a window used for said filtering.

10. The method of claim 9 wherein said upscaling and said image filter are based upon the same pixels in a buffer.

11. The method of claim 7 further comprising said modified image having a second sharpness.

12. A method for modifying an image from a first scale to a modified image having a different scale:
   (a) receiving said image having a first sharpness at said first scale;

(b) filtering said image with an image filter to result in the creation of a first channel and a second channel, wherein said first channel includes primarily texture information and said second channel includes primarily edge and flat region information;

(c) filtering said first channel to attenuate higher frequency content of said image in said first channel;

(d) filtering said second channel to sharpen said image in said second channel;

(e) upscaling said image from said first scale to said second scale, wherein said upscaling, said filtering of said second channel, and said filtering of said first channel are based upon a plurality of the same pixels of said image from the same buffer and wherein the size of a window used for said upscaling is less than the size of a window used for at least one of said filtering of said first channel and said filtering of said second channel;

(f) combining said first channel, said second channel, and said image upscaled to said second scale to form said modified image having said different scale.

13. The method of claim 12 wherein said upscaling and said image filters are based upon at least some of the same pixels in a buffer.

* * * * *